(12) United States Patent
Singer et al.

(10) Patent No.: US 12,190,383 B2
(45) Date of Patent: *Jan. 7, 2025

(54) USER DEFINABLE PRIORITIZATION OF MARKET INFORMATION

(71) Applicant: TRADING TECHNOLOGIES INTERNATIONAL, INC., Chicago, IL (US)

(72) Inventors: Scott F. Singer, Green Oaks, IL (US); Brian J. Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,548

(22) Filed: Nov. 15, 2023

(65) Prior Publication Data
US 2024/0087020 A1    Mar. 14, 2024

Related U.S. Application Data

(63) Continuation of application No. 18/159,433, filed on Jan. 25, 2023, now Pat. No. 11,869,086, which is a continuation of application No. 17/468,209, filed on Sep. 7, 2021, now Pat. No. 11,593,880, which is a continuation of application No. 16/589,723, filed on Oct. 1, 2019, now Pat. No. 11,138,663, which is a continuation of application No. 13/732,122, filed on Dec. 31, 2012, now Pat. No. 10,467,691.

(51) Int. Cl.
*G06Q 40/04*     (2012.01)

(52) U.S. Cl.
CPC .................... *G06Q 40/04* (2013.01)

(58) Field of Classification Search
CPC .................................................. G06Q 40/04
See application file for complete search history.

(56) References Cited

U.S. PATENT DOCUMENTS

| 4,644,472 A | 2/1987 | Montgomery |
| 5,220,361 A | 6/1993 | Lehmer et al. |

(Continued)

FOREIGN PATENT DOCUMENTS

JP         3804454 B2    8/2006

OTHER PUBLICATIONS

"UK—Cautious Investment in Digital Investment in the City," Dealing Technology Bulletin, Jan. 1, 1991, p. 4.

(Continued)

*Primary Examiner* — Eric T Wong
*Assistant Examiner* — Matthew Cobb
(74) *Attorney, Agent, or Firm* — McDonnell Boehnen Hulbert & Berghoff LLP

(57) ABSTRACT

Methods and systems for user definable prioritization of market information are disclosed. An example method to prioritize market information displayed in a window within a trading interface includes updating the market information displayed in the window at a first frequency, wherein the first frequency is to correspond to a first window priority. The example method also includes, based on a trigger activation, assigning a second window priority to the window, wherein the second window priority is to cause the market information displayed in the window to update at a second frequency, the second frequency different from the first frequency.

15 Claims, 8 Drawing Sheets

(56) References Cited

U.S. PATENT DOCUMENTS

| | | |
|---|---|---|
| 5,339,392 A | 8/1994 | Risberg et al. |
| 5,347,452 A | 9/1994 | Bay, Jr. |
| 5,471,542 A | 11/1995 | Ragland |
| 5,474,565 A | 12/1995 | Trott |
| 5,596,699 A | 1/1997 | Driskell |
| 5,689,651 A | 11/1997 | Lozman |
| 5,797,002 A | 8/1998 | Patterson, Jr. et al. |
| 5,831,954 A | 11/1998 | Sako et al. |
| 5,937,388 A | 8/1999 | Davis et al. |
| 6,106,119 A | 8/2000 | Edwards |
| 6,134,535 A | 10/2000 | Belzberg |
| 6,272,474 B1 | 8/2001 | Garcia |
| 6,487,478 B1 | 11/2002 | Azzarro et al. |
| 6,577,329 B1 | 6/2003 | Flickner et al. |
| 6,608,615 B1 | 8/2003 | Martins |
| 6,766,304 B2 | 7/2004 | Kemp, II et al. |
| 6,772,132 B1 | 8/2004 | Kemp, II et al. |
| 6,792,617 B2 | 9/2004 | Gorbatov et al. |
| 6,801,201 B2 | 10/2004 | Escher |
| 6,834,053 B1 | 12/2004 | Stacey et al. |
| 6,883,143 B2 | 4/2005 | Driskell |
| 6,910,024 B2 | 6/2005 | Krishnamurthy et al. |
| 6,934,735 B1 | 8/2005 | Emens et al. |
| 6,981,052 B1 | 12/2005 | Cheriton |
| 6,988,132 B2 | 1/2006 | Horvitz |
| 7,000,181 B2 | 2/2006 | Press |
| 7,002,570 B2 | 2/2006 | Perry et al. |
| 7,110,974 B1 | 9/2006 | Rust |
| 7,113,190 B2 | 9/2006 | Heaton |
| 7,124,110 B1 | 10/2006 | Kemp, II et al. |
| 7,127,424 B2 | 10/2006 | Kemp, II et al. |
| 7,138,575 B2 | 11/2006 | Childs, Jr. et al. |
| 7,139,938 B2 | 11/2006 | Marwaha |
| 7,143,186 B2 | 11/2006 | Stewart et al. |
| 7,155,477 B2 | 12/2006 | Blair et al. |
| 7,177,833 B1 | 2/2007 | Marynowski et al. |
| 7,184,966 B1 | 2/2007 | Parsonnet et al. |
| 7,202,793 B2 | 4/2007 | Grace et al. |
| 7,239,612 B1 | 7/2007 | Cole et al. |
| 7,260,543 B1 | 8/2007 | Saulpaugh et al. |
| 7,301,952 B2 | 11/2007 | Furukawa et al. |
| 7,308,428 B1 | 12/2007 | Federspiel et al. |
| 7,356,501 B2 | 4/2008 | Churquina |
| 7,389,268 B1 | 6/2008 | Kemp, II et al. |
| 7,391,887 B2 | 6/2008 | Durnell |
| 7,394,968 B2 | 7/2008 | Watkins |
| 7,401,334 B2 | 7/2008 | Fussell |
| 7,434,225 B2 | 10/2008 | Groetzner et al. |
| 7,447,645 B2 | 11/2008 | Spragle et al. |
| 7,466,871 B2 | 12/2008 | Hosoda et al. |
| 7,469,283 B2 | 12/2008 | Eyal et al. |
| 7,493,407 B2 | 2/2009 | Leedom et al. |
| 7,552,077 B1 | 6/2009 | Schluetter et al. |
| 7,562,041 B2 | 7/2009 | Chehade et al. |
| 7,590,587 B2 | 9/2009 | Duquette |
| 7,680,721 B2 | 3/2010 | Cutler |
| 7,685,049 B1 | 3/2010 | Singer |
| 7,698,187 B2 | 4/2010 | Huizing et al. |
| 7,701,456 B2 | 4/2010 | Buck |
| 7,702,806 B2 | 4/2010 | Gil et al. |
| 7,739,182 B2 | 6/2010 | Myr |
| 7,743,340 B2 | 6/2010 | Horvitz et al. |
| 7,747,486 B1 | 6/2010 | Smith |
| 7,747,513 B2 | 6/2010 | Duquette et al. |
| 7,758,811 B2 | 7/2010 | Durack et al. |
| 7,761,362 B2 | 7/2010 | Triplett |
| 7,783,558 B1 | 8/2010 | Schwarz et al. |
| 7,818,232 B2 | 10/2010 | Mead et al. |
| 7,844,726 B2 | 11/2010 | Foygel et al. |
| 7,844,776 B2 | 11/2010 | Chen |
| 7,873,827 B2 | 1/2011 | Miyazawa |
| 7,877,312 B2 | 1/2011 | Thompson et al. |
| 7,913,183 B2 | 3/2011 | Czerwinski et al. |
| 7,941,357 B2 | 5/2011 | McGeorge |
| 7,945,508 B2 | 5/2011 | Duquette et al. |
| 7,962,398 B1 | 6/2011 | Swearingen et al. |
| 8,108,299 B1 * | 1/2012 | Waelbroeck ............ G06Q 40/04 705/37 |
| 8,117,102 B1 | 2/2012 | Buck |
| 8,131,868 B2 | 3/2012 | Foygel et al. |
| 8,154,227 B1 | 4/2012 | Young et al. |
| 8,232,962 B2 | 7/2012 | Buck |
| 8,286,867 B1 | 10/2012 | Brown et al. |
| 8,290,850 B1 | 10/2012 | Singer |
| 8,433,645 B1 | 4/2013 | Waelbroeck et al. |
| 8,547,330 B2 | 10/2013 | Buck |
| 8,553,677 B2 | 10/2013 | Furukawa et al. |
| 8,555,288 B2 | 10/2013 | Brown et al. |
| 8,560,429 B2 | 10/2013 | Buck |
| 8,745,157 B2 * | 6/2014 | Bradnick ................ H04L 43/10 709/236 |
| 8,854,302 B2 | 10/2014 | Buck |
| 8,856,267 B2 | 10/2014 | Sullivan et al. |
| 8,868,776 B2 | 10/2014 | Foygel et al. |
| 8,934,484 B2 | 1/2015 | Furukawa et al. |
| 9,137,268 B2 | 9/2015 | Uamg |
| 9,351,133 B2 | 5/2016 | Offen et al. |
| 9,450,404 B2 | 9/2016 | Chung |
| 9,639,896 B2 | 5/2017 | Foygel et al. |
| 9,772,685 B2 | 9/2017 | Buck |
| 10,101,808 B2 | 10/2018 | Buck |
| 10,380,688 B2 | 8/2019 | Foygel et al. |
| 10,460,387 B2 | 10/2019 | Singer et al. |
| 10,467,691 B2 | 11/2019 | Singer et al. |
| 10,698,480 B2 | 6/2020 | Buck |
| 10,700,986 B2 | 6/2020 | Rahul et al. |
| 10,708,440 B1 | 7/2020 | Liu et al. |
| 10,733,670 B2 | 8/2020 | Foygel et al. |
| 11,138,663 B2 | 10/2021 | Singer et al. |
| 11,176,611 B2 | 11/2021 | Singer et al. |
| 11,256,329 B2 | 2/2022 | Buck |
| 11,257,159 B2 | 2/2022 | Foygel et al. |
| 2001/0056391 A1 | 12/2001 | Schultz |
| 2002/0009073 A1 | 1/2002 | Furukawa et al. |
| 2002/0023038 A1 | 2/2002 | Fritsch et al. |
| 2002/0026404 A1 | 2/2002 | Thompson |
| 2002/0039111 A1 | 4/2002 | Gips et al. |
| 2002/0052821 A1 | 5/2002 | Terashima |
| 2002/0055899 A1 | 5/2002 | Williams |
| 2002/0069079 A1 | 6/2002 | Vega |
| 2002/0130858 A1 | 9/2002 | Perry et al. |
| 2002/0130868 A1 | 9/2002 | Smith |
| 2002/0161685 A1 | 10/2002 | Dwinnell |
| 2002/0174199 A1 | 11/2002 | Horvitz |
| 2002/0188654 A1 | 12/2002 | Tedone et al. |
| 2003/0009411 A1 | 1/2003 | Ram et al. |
| 2003/0038754 A1 | 2/2003 | Goldstein et al. |
| 2003/0177085 A1 | 9/2003 | Buckwalter et al. |
| 2003/0236737 A1 | 12/2003 | Kemp, II et al. |
| 2004/0048053 A1 | 3/2004 | Wu et al. |
| 2004/0055447 A1 | 3/2004 | Childs, Jr. et al. |
| 2004/0056900 A1 | 3/2004 | Blume |
| 2004/0066414 A1 | 4/2004 | Czerwinski et al. |
| 2004/0070509 A1 | 4/2004 | Grace et al. |
| 2004/0098462 A1 | 5/2004 | Horvitz et al. |
| 2004/0100467 A1 | 5/2004 | Heaton |
| 2004/0210504 A1 | 10/2004 | Rutman |
| 2005/0060256 A1 | 3/2005 | Peterson et al. |
| 2005/0122985 A1 | 6/2005 | Murphy |
| 2005/0144113 A1 | 6/2005 | Opperman et al. |
| 2005/0192887 A1 | 9/2005 | Triplett |
| 2006/0037038 A1 | 2/2006 | Buck |
| 2006/0080215 A1 | 4/2006 | Warsaw et al. |
| 2006/0195508 A1 | 8/2006 | Bernardin et al. |
| 2006/0242447 A1 | 10/2006 | Radhakrishnan et al. |
| 2006/0259384 A1 | 11/2006 | Schluetter et al. |
| 2006/0265651 A1 | 11/2006 | Buck |
| 2006/0294228 A1 | 12/2006 | Almstrom |
| 2007/0100735 A1 | 5/2007 | Kemp, II et al. |
| 2007/0168104 A1 | 7/2007 | Nelson et al. |
| 2007/0198397 A1 | 8/2007 | McGinley et al. |
| 2007/0297423 A1 | 12/2007 | Furukawa et al. |
| 2008/0025288 A1 | 1/2008 | Benner et al. |
| 2008/0049787 A1 | 2/2008 | McNaughton et al. |

(56) References Cited

U.S. PATENT DOCUMENTS

| | | |
|---|---|---|
| 2008/0056289 A1 | 3/2008 | Furukawa et al. |
| 2008/0097887 A1 | 4/2008 | Duquette et al. |
| 2008/0162324 A1* | 7/2008 | West .................. G06Q 40/04 705/37 |
| 2008/0183639 A1* | 7/2008 | DiSalvo ................ G06Q 40/06 705/36 R |
| 2010/0023645 A1 | 1/2010 | Foygel et al. |
| 2010/0094745 A1* | 4/2010 | Peterffy ................ G06Q 40/06 705/37 |
| 2010/0228833 A1 | 9/2010 | Duquette et al. |
| 2010/0235273 A1 | 9/2010 | Friesen et al. |
| 2010/0293110 A1* | 11/2010 | Rosenthal .............. G06Q 40/06 715/788 |
| 2010/0318673 A1 | 12/2010 | Kemp, II et al. |
| 2011/0040890 A1 | 2/2011 | Foygel et al. |
| 2011/0087581 A1 | 4/2011 | Ram et al. |
| 2011/0106684 A1 | 5/2011 | Fuller et al. |
| 2011/0184849 A1 | 7/2011 | Duquette et al. |
| 2012/0062729 A1 | 3/2012 | Hart et al. |
| 2012/0109813 A1 | 5/2012 | Buck |
| 2012/0131221 A1 | 5/2012 | Foygel et al. |
| 2012/0203687 A1 | 8/2012 | Schwarz et al. |
| 2012/0233059 A1 | 9/2012 | Buck |
| 2012/0271748 A1 | 10/2012 | DiSalvo |
| 2013/0160073 A1 | 6/2013 | You |
| 2013/0185421 A1 | 7/2013 | Yang |
| 2013/0294336 A1 | 11/2013 | Morken et al. |
| 2013/0339214 A1 | 12/2013 | Buck |
| 2014/0019325 A1 | 1/2014 | Buck |
| 2014/0188682 A1 | 7/2014 | Singer et al. |
| 2014/0280621 A1 | 9/2014 | Bourdaillet et al. |
| 2015/0006356 A1 | 1/2015 | Foygel et al. |
| 2015/0012403 A1 | 1/2015 | Buck |
| 2015/0036569 A1 | 2/2015 | Vannithamby et al. |
| 2015/0046514 A1 | 2/2015 | Madan et al. |
| 2015/0170274 A1 | 6/2015 | Singer |
| 2016/0105561 A1 | 4/2016 | Glagolev et al. |
| 2017/0180336 A1 | 6/2017 | Josephson et al. |
| 2017/0186088 A1 | 6/2017 | Foygel et al. |
| 2017/0371409 A1 | 12/2017 | Buck |
| 2018/0357573 A1 | 12/2018 | Scarborough et al. |
| 2019/0011985 A1 | 1/2019 | Buck |
| 2019/0311435 A1 | 10/2019 | Singer et al. |
| 2020/0020035 A1 | 1/2020 | Singer et al. |
| 2020/0034930 A1 | 1/2020 | Singer et al. |
| 2020/0285312 A1 | 9/2020 | Buck |
| 2020/0320629 A1 | 10/2020 | Foygel et al. |
| 2021/0407004 A1 | 12/2021 | Singer et al. |
| 2022/0020090 A1 | 1/2022 | Singer et al. |

OTHER PUBLICATIONS

Definition of the term "period of time" Webpage [on line], The Free Dictionary, Princeton University and Farlex, Inc., n.d., 2 pages. [Retrieved on May 10, 2012] from the Internet: http://www.thefreedictionary.com/period+of+time.

Definition of the term "substantial" Webpage [on line], Free Merriam-Webster Dictionary, Merriam-Webster, Inc., 2012 2 pages. [Retrieved on May 10, 2012] from the Internet: http://www.merriam-webster.com/dictionary/substantial.

Extended European Search Report in European Patent Application No. 09803429.1 dated Aug. 12, 2013, mailed Aug. 26, 2013.

Gresh, D.L, et al., "An Interactive Framework for Visualizing Foreign Currency Exchange Options," Proceeding Visualization 1999, San Francisco, CA, Oct. 24, 29, 1999, Piscataway, NY: IEEE, 1999, Abstract, p. 1.

International Preliminary Report on Patentability for International Application No. PCT/US2005/021700, dated Dec. 28, 2006 and Written Opinion dated Oct. 25, 2005 (mailed Dec. 29, 2005).

International Search Report and Written Opinion of International Application No. PCT/US2013/035652, dated Jul. 2, 2013 (mailed Jul. 11, 2013).

International Search Report of International Application No. PCT/US2009/051820, dated Sep. 1, 2009 (mailed Sep. 15, 2009).

Jereski, L. and Zweig, C., "The Mouse that Trades," Forbes, Oct. 28, 1991, p. 186 [Retrieved on Nov. 2, 2009] from Dialog at https://www.dialogclassic.com/mainframe/html (3 pages).

Macklem, K., "Only for the Stout of Heart: In the Heat of a Day-Trading Room, a Mere Touch on a Computer Keyboard as You Watch Intraday Gyrations of Stock Markets Can Earn or Cost Thousands of Dollars," Feb. 13, 1999, pp. 1-2.

Takaaki, Y., "Stock Violation Index Calculation Processing Program," Feb. 21, 2003, p. 1.

Vertical News, Title: Sony Interactive Entertainment Inc .; Patent Issued for Video Analysis Device, Video Analysis Method, and Point-Of-Gaze Display System (U.S. Pat. No. 9,727,130), Aug. 21, 2017:2973, Journal of Engineering—Atlanta (Aug. 2, 20171)—First p. 2973. Publisher: NewsRx LLC (Year: 2017).

* cited by examiner

USER DEFINABLE PRIORITIZATION OF MARKET INFORMATION

CROSS REFERENCE TO RELATED APPLICATIONS

This application is a continuation of U.S. patent application Ser. No. 18/159,433 filed Jan. 25, 2023, now U.S. Pat. No. 11,869,086, which is a continuation of U.S. patent application Ser. No. 17/468,209 filed Sep. 7, 2021, now U.S. Pat. No. 11,593,880, which is a continuation of U.S. patent application Ser. No. 16/589,723 filed Oct. 1, 2019, now U.S. Pat. No. 11,138,663, which is a continuation of U.S. patent application Ser. No. 13/732,122 filed Dec. 31, 2012, now U.S. Pat. No. 10,467,691, the contents of each of which are fully incorporated herein by reference for all purposes.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

Advances in how a trading device communicates with the electronic exchange have resulted in an increased amount of market information generated by the electronic trading system. The frequency at which the market information is conveyed via the electronic trading system is also increasing. The amount of computing resources used by a trading device running a trading application to process the high-frequency market information updates and to display these updates upon a trading screen can be very high. In some instances, the cost of computing resources used to process and to display the market information can adversely impact all other processing on the trading device.

BRIEF DESCRIPTION OF THE FIGURES

Certain embodiments are disclosed with reference to the following drawings.

Figure 1:
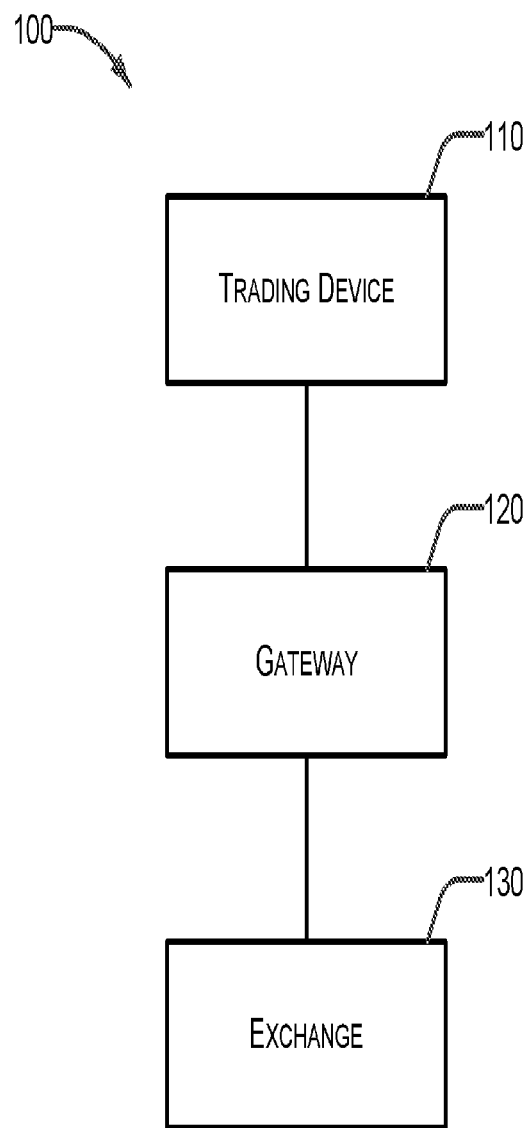
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading environments and, more particularly, to user definable prioritization of market information.

Market information conveyed in a trading system includes a large amount of data and is conveyed at high speed and/or short intervals. As the trading market grows, so too does the amount of data conveyed. Furthermore, servers and devices included in the trading system are expected to convey the market information at faster and faster speeds and/or over shorter intervals. In some examples, processing and displaying the market information may result in a significant portion of computing resources being used by a trading device. For example, the amount of network resources required to process and to display the market information can be large and impact all trading devices sharing the network.

Embodiments disclosed herein recognize that not all windows in a trading interface displaying market information have the same importance to a trader. Unlike prior trading systems, embodiments disclosed herein implement updating (or refreshing) windows, and the information contained within the window, based on a priority level. According to embodiments disclosed herein, the window priority is defined by a trader. According to embodiments disclosed herein, boost triggers may cause adjusting a window priority without user (e.g., trader) intervention. According to embodiments disclosed herein, characteristics of a window priority may vary based on the type of trading device processing and/or displaying the window.

Embodiments disclosed herein also recognize that not all components of the market information have the same importance to a trader. Unlike prior trading systems, embodiments disclosed herein implement prioritizing the market information based on the importance to the trader. According to embodiments disclosed herein, higher priority components of the market information are processed (or updated) before lower priority components of the market information. In some examples, updates to lower priority components are rejected (e.g., canceled, delayed, etc.) until a snapshot trigger causes a full market information update.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description Of Certain Embodiments

Certain embodiments provide a method to prioritize market information displayed in a window within a trading interface includes updating the market information displayed in the window at a first frequency, wherein the first frequency is to correspond to a first window priority. The example method also includes, based on a trigger activation, assigning a second window priority to the window, wherein the second window priority is to cause the market information displayed in the window to update at a second frequency, the second frequency different from the first frequency.

Certain embodiments provide a method of updating market information displayed within a trading interface based on a priority. The example method includes comparing a component of the market information to an update condition, wherein the update condition is to correspond to the component. The example method also includes communicating the market information corresponding to the component if the market information corresponding to the component satisfies the update condition, and otherwise, filtering the market information corresponding to the component.

Certain embodiments provide a method of updating market information displayed on a client device via a trading interface. The example method includes updating market information displayed in a window within the trading interface at a first frequency, wherein the first frequency is to correspond to a first window priority. The example method also includes identifying a trigger activation, wherein the trigger is to correspond to the window. The example method also includes assigning a second window priority to the window, wherein the second window priority is to cause market information displayed in the window to update at a second frequency, the second frequency different from the first frequency.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The example electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data (or market information) may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other price levels away from the inside market. There may be "gaps" in the market depth where there are price levels which do not have quantities available.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
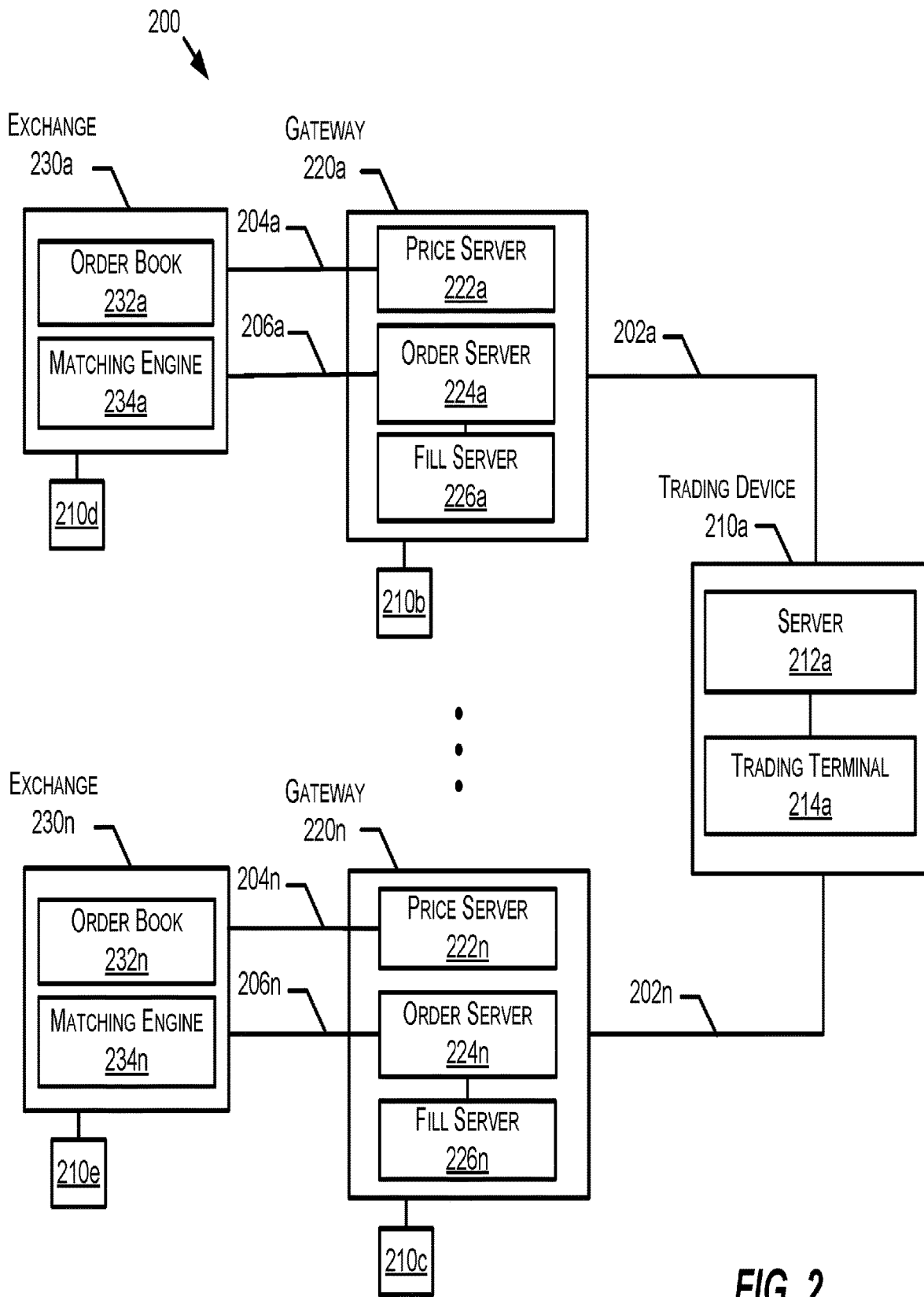
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
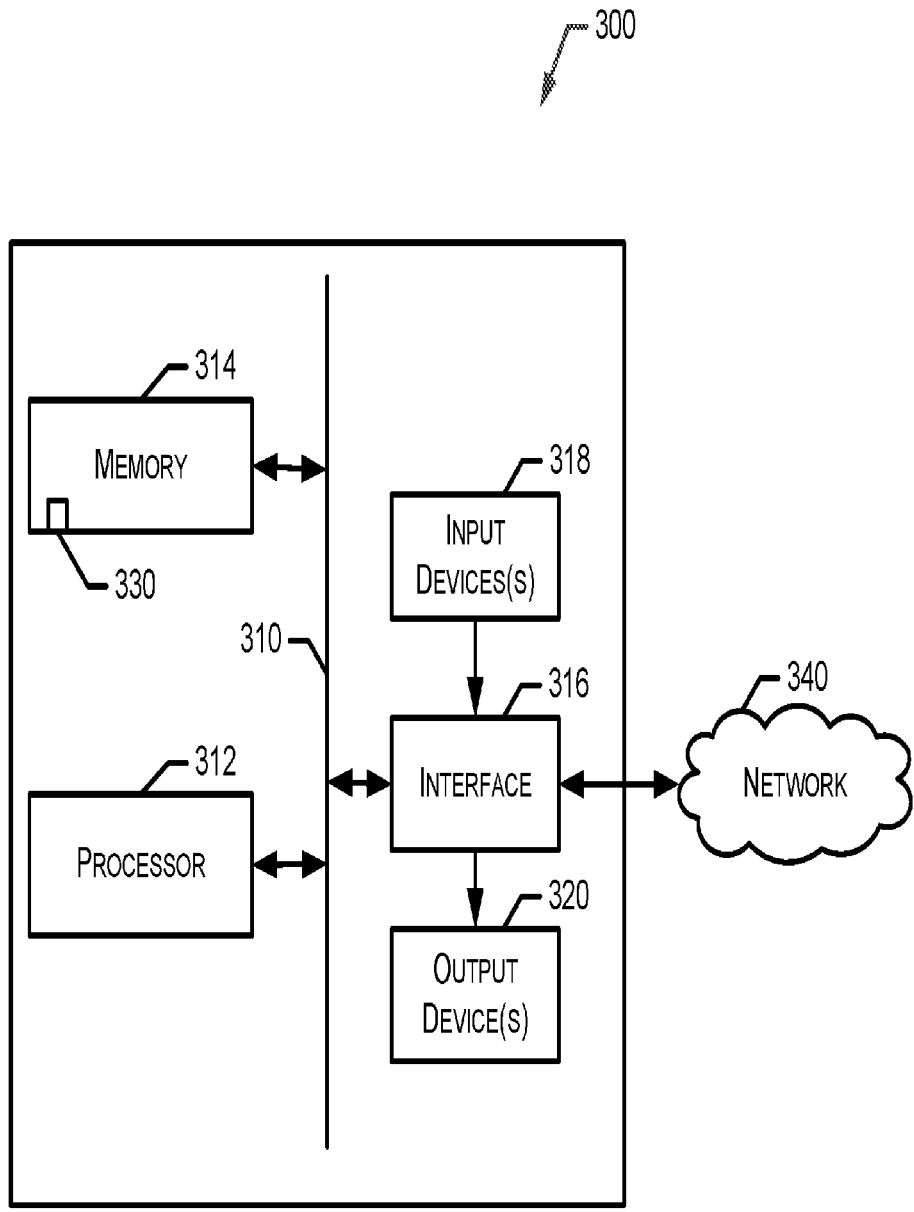
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Examples of Updating Trading Windows Based on Priority Levels

As described above, trading applications may have windows displaying various components of market information. In some examples, these windows may represent information for tradable objects in which a trader has previously submitted orders or received fills, or has done so during a previous trading session (e.g., a recent trading session, a trading session from a previous day, week, month, etc.). These windows, or the tradable objects they represent, may also have been previously used by the trader to view market information. In other examples, these windows may not have been used previously for these activities. In some examples, these windows display synthetic and/or exchange-traded strategies created by the trader. In other examples, the trading window may display market depth, profits, losses, fills, current positions and/or pending orders, etc. However, displays of other combinations of market information in a trading window may additionally be used. As a result, not all trading windows showing market information (e.g., price feeds, market feeds, etc.) may be of equal importance to the trader.

Figure 4:
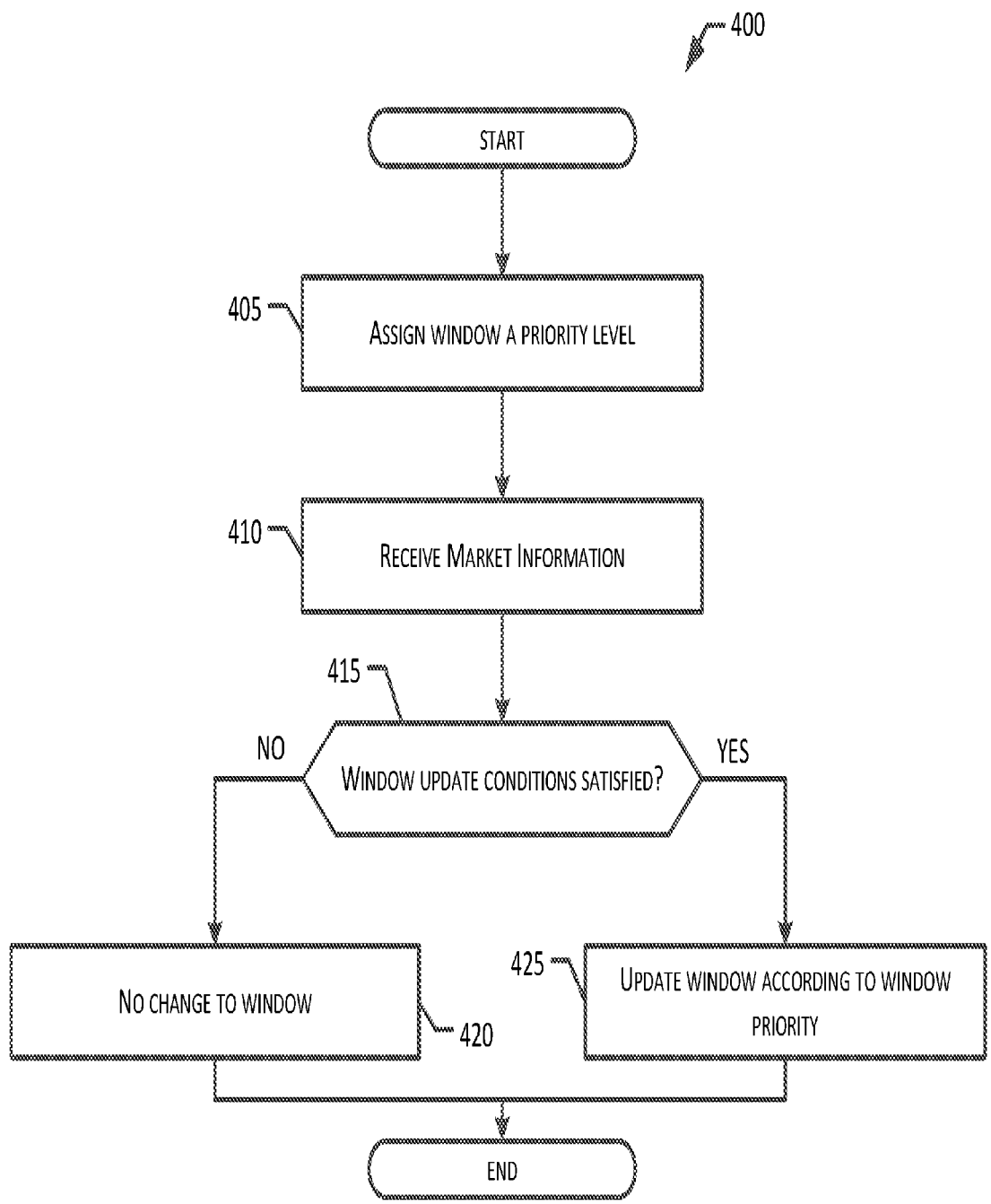
FIG. 4 illustrates a flow diagram representative of example machine readable instructions that may be executed to implement disclosed embodiments.
Figure 5:
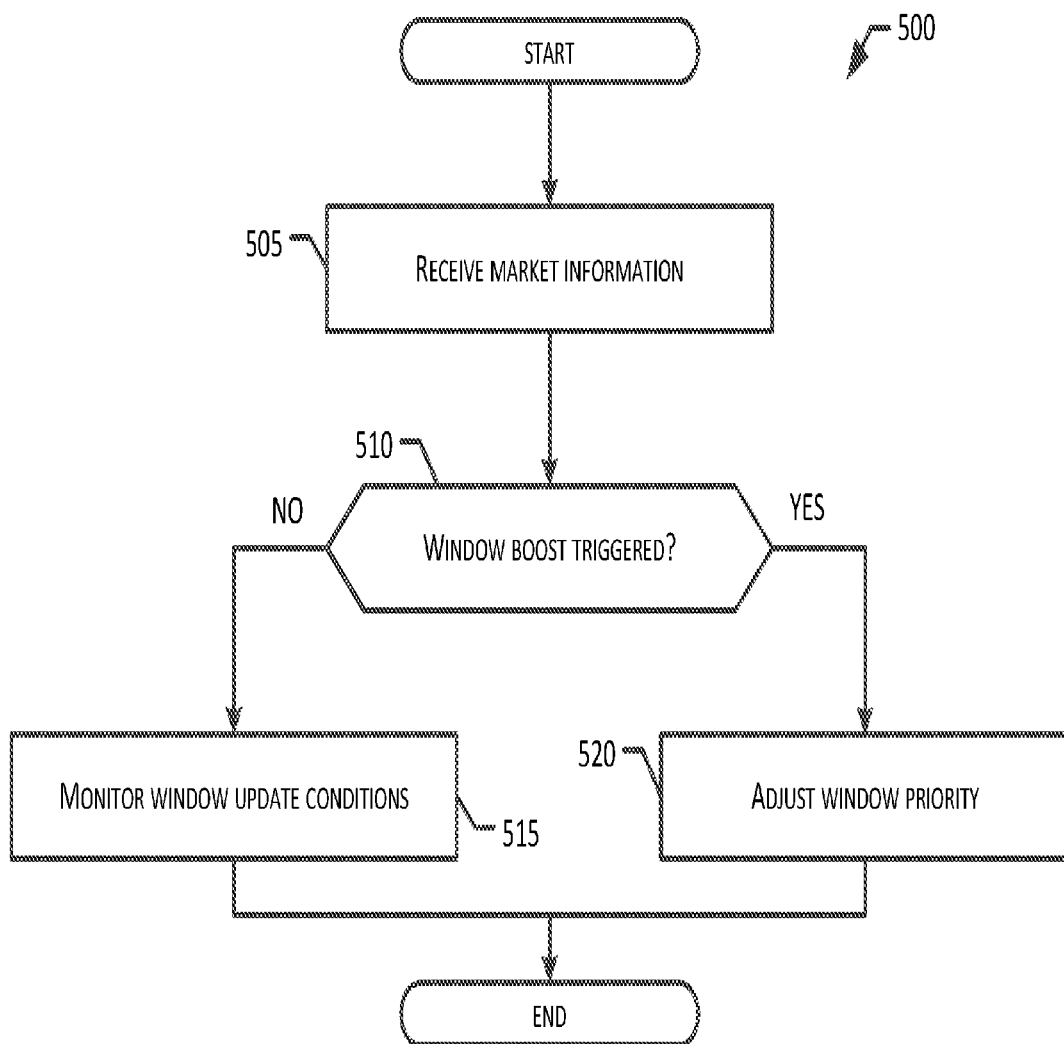
FIG. 5 illustrates a flow diagram representative of example machine readable instructions that may be executed to implement disclosed embodiments.

FIGS. 4 and 5 are flow diagrams representative of example operations that can be executed to implement the teachings of this disclosure. The example operations of FIGS. 4 and 5 can be implemented by, for example, the example trading device 110 of FIG. 1 and/or the example trading device 210a of FIG. 2. While the example trading device 110 of FIG. 1 is described as executing the example operations of FIGS. 4 and 5 below, any suitable device can execute the example operations of FIGS. 4 and 5. The example operations of FIGS. 4 and 5 implement updating trading windows based on priority levels.

In the example of FIG. 4, a trading window is updated based on a priority level, and whether the window update conditions for the priority level are satisfied. The example process 400 of FIG. 4 begins by assigning a trading window a priority (block 405). For example, a user assigns a priority level ranging from one and ten to a trading window. In the example, a priority level of one represents a lowest priority level, and a priority level of ten represents a highest priority level. Different priority levels refresh varying components of the market information and/or have varying frequencies for updating the trading window. For example, a timer or other timed update condition may cause one or more trading windows with at least the lowest priority level to update. For example, when the update condition(s) of a priority level of one are satisfied (e.g., a timer expires), at least one component of the market information displayed in the trading window is updated (e.g., one market information update per minute). In some examples when one or more trading windows update, any and/or all trading windows with a higher priority level are also updated. For example, when a trading window with a priority level of six is updated, trading window(s) with a priority level of seven, eight, nine and/or ten are also updated. In contrast, when the update condition(s) of a priority level of ten are satisfied (e.g., a change in any component of the market information), for example, all components of the market information displayed within the trading window are updated in (or substantially near) real-time. Additionally, when the update conditions of in-between priority levels are satisfied, different combinations of components may update. For example, when one or more of a last traded price, a last traded quantity, a best bid, or a best ask (or offer) changes, or a corresponding timer expires, the one or more components of the market information is updated. Thus, the user may assign a priority level to a trading window based on the importance of the market information displayed within the trading window to the user.

In some examples, the varying priority levels may affect how the trading device is receiving the market information. For example, higher priority levels may subscribe to market information updates. That is, a trading window with a relatively high priority level is given or provided (e.g., pushed) any available market information updates. In other examples, lower priority levels may poll (or ask or request) for market information updates. In some examples, the priority levels that qualify as relatively high priority levels or that qualify as relatively low priority levels are selected by the user. In other examples, the qualifying priority levels may be preset and may be modified by the user.

In some examples, the priority levels may depend on the trading device. For example, when using a trading application on a mobile device (e.g., a smart phone, a tablet, a laptop, etc.), fewer priority levels may be available for assigning to the trading window. In some examples, the window update conditions corresponding to a priority level may include additional and/or more stringent update conditions associated with a mobile device. As a result, the number of times the mobile device has to render graphics of the trading application is reduced. Thus, it is beneficial to less frequently render graphics on the mobile device as this is useful in preserving the battery life of the mobile device. In some examples, a user may disable a setting to adjust the priority levels based on the trading device. In some examples, the trading window priority levels available to a trader may automatically adjust when switching to a mobile device. That is, the window update conditions for a priority level may be different when running the trading application on a server versus when running the trading application on a mobile device.

When updated market information is received by the trading device (block 410), a determination is made whether the window update conditions are satisfied (block 415). Additionally, the requirements to satisfy the window update conditions vary based on the priority level. For example, the window update conditions of the lowest priority level (e.g., a priority level of one) may be satisfied when a timer expires. Additionally, the window update conditions of the highest priority level (e.g., a priority level of ten) may be satisfied when any of the components of the market information displayed in the trading window changes. When the window update conditions corresponding to the priority level of the trading window are not satisfied (block 415), no change is made to the market information displayed in the trading window (block 420) and control returns to block 410 when the trading device receives updated market information.

When the window update conditions corresponding to the priority level of the trading window are satisfied (block 415), the market information displayed in the trading window is updated accordingly (block 425). For example, various combinations of one or more components of the market information displayed in the trading window are updated according to the priority level of the trading window. Control returns to block 410 when updated market information is received by the trading device.

In some examples, updated market information may cause the priority level of a trading window to adjust without user intervention. FIG. 5 is a flow diagram representative of example operations that can be executed to automatically adjust the priority level of a trading window. In the example of FIG. 5, the priority level of a trading window may increase when the occurrence of an event triggers the window boost. The example process 500 of FIG. 5 begins by receiving updated market information (block 505). For example, the trading device may receive updated market information containing, for example, price feeds, from a gateway such as the example gateway 120 of FIG. 1 and/or the example gateway 220 of FIG. 2.

A determination is made regarding whether a window boost has been triggered (block 510). A window boost describes either a temporary or permanent increase in the priority level assigned to a window in order to increase the frequency at which information is updated and displayed. A window boost trigger is an event that causes the priority level of a trading window to be either temporarily or permanently increased (block 520). For example, a window boost trigger may be dependent on a condition such as a change in the last traded price outside of a specified range may trigger a window boost. For example, the window boost may be triggered when the last traded price moves more than, for example, two ticks over a period. In some examples, an occurrence of a pre-defined volume or quantity of trades may trigger a window boost. For example, the window boost may be triggered when the quantity of trades is greater than or equal to an even number of one hundred trades (e.g., when the quantity of trades is equal to 200, 400, etc.). In some examples, movement or a change of the inside market may trigger a window boost. In some examples, scheduled times may trigger a window boost. For example, a window boost may be triggered near the open or close of a market. In other examples, a window boost trigger may be scheduled for a period before and/or after the monthly jobs report is released. In some examples, the expiration of a timer may trigger a window boost. In some examples, the activity within a trading window may trigger a window boost. For example, a window boost for a trading window may be triggered when the trading window includes a working order and/or the window has positions. Other window boost triggers are also possible. For example, user activity may trigger a window boost. For example, orders, fills and/or positions during a previous number of trading sessions may trigger a window boost. Control returns to block 505 when the trading device receives updated market information.

In some examples, the priority level caused by the window boost may revert or fade to the original priority level over time. For example, the priority level may revert back to the original priority level sequentially over a period of time. For example, a trading window with a priority level of ten due to the window boost may change to a priority level of nine after one minute, change to a priority level of eight after a second minute, and so on until the pre-window boost priority level is reached. In some examples, certain events or non-events may cause the priority level of the trading window to revert to the pre-window boost priority level. For example, if the last traded quantity does not change over a ten second period after the window boost, the priority level sequentially reverts to the pre-window priority level. In some examples, the priority level may revert to the pre-window priority level nearly immediately after the window boost.

In some examples, a user and/or an administrator may select to disable one or more window boost triggers. For example, the user may disable the window boost triggered by movement or change of the inside market. That is, a movement or change of the inside market causes no adjustment to the priority level of the trading window. In other examples, a user may disable all window boosts.

When a window boost is not triggered (block 510), the window update conditions are monitored (block 515). For example, a determination is made whether the window update conditions have been satisfied by the updated market information similar to block 410 of FIG. 4. Control returns to block 505 when updated market information is received at the trading device.

VI. Examples of Customizable Market Information Conveyed to a Trading Device As described above, certain trading windows may be of greater importance to a trader. Similarly, certain components of the market information may be of greater importance to the trader. For example, a trader may place a higher priority on price level changes or movement within a market than they would on the change in quantity available at a given price level, while another trader may value best bid and/or best ask prices. Additionally, increasing amounts of market information results in increasing amounts of computing resources to process the market information. Thus, it is beneficial to coalesce (or segregate) the market information based on the importance to the trader. In some examples, coalescing strategies may pass the latest known values, while filtering (or removing) repeated values. As a result, an electronic exchange, gateway or intermediary component reduces the computing resources (e.g., bandwidth) used to convey the market information to the trading device. Additionally, a trading device has less information to process and delivery of important market information is prioritized. For example, when multiple components need to update in a trading window, the order the components update is based on a user provided priority.

Figure 6:
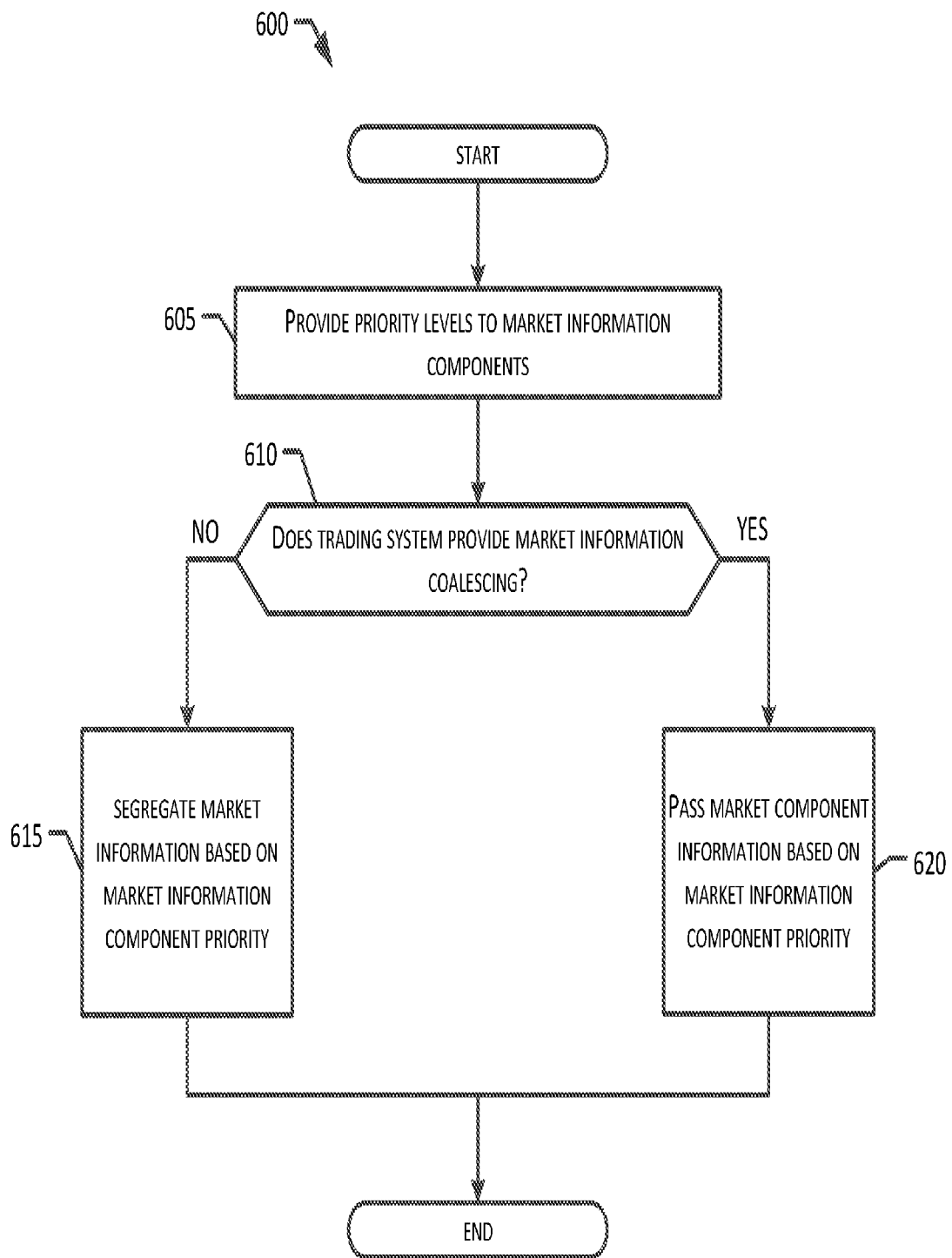
FIG. 6 illustrates a flow diagram representative of example machine readable instructions that may be executed to implement disclosed embodiments.

FIG. 6 is a flow diagram representative of example operations that can be executed to implement the teachings of this disclosure. The example operations of FIG. 6 can be implemented by, for example, the example electronic exchange 130 of FIG. 1 and/or the example electronic exchange 230*a* of FIG. 2. While the example electronic exchange 130 of FIG. 1 is described as executing the example operations of FIG. 6 below, any suitable device can execute the example operations of FIG. 6.

To update market information at the trading device in an order preferred by a user, the components of the market information are associated with different component priority levels. In the example of FIG. 6, the market component information is filtered out (e.g., dropped) or updated based on the component priority levels of the market information component. The example process 600 of FIG. 6 begins by providing priority levels to components of the market information (block 605). For example, high priority market information components may include price level changes or last traded prices. In the illustrated example, low priority market information components may include quantity changes. In some examples, the priority level demarcations are selected by a user. Thus, high priority market information components and low priority market information components are selected on a user-by-user basis. In some examples, the priority levels of the market information components may be preselected (e.g., a default configuration), and may be modified by the user.

When market information is received (e.g., at the example gateway 120 or an intermediary component) or generated (e.g., by the example electronic exchange 130), a determination is made whether the trading system (e.g., the example trading system 100 of FIG. 1) provides market information coalescing (block 610). When the trading system does not provide market information coalescing, the market information is segregated based on the market information component priority level (block 615). For example, the electronic exchange 130 may pass high priority market component information and filter out low priority market component information. As a result, high priority market component information is updated more frequently and/or in (or substantially near) real-time. In the illustrated example, low priority market component information may be filtered out or dropped by, for example, the electronic exchange 130, the gateway 120 and/or the trading device 110. Thus, the market information is filtered out based on the priority level of the market information component, resulting in less market information being conveyed to components downstream from the filtering component. A component is downstream from the filtering component if the filtering component can communicate market information down to the component. In some examples, a change in the highest priority market information component may cause a full market information update. That is, all market information is passed. The example process 600 of FIG. 6 then ends.

When the trading system does provide market information coalescing (block 610), market component information is passed to downstream components based on the priority level of the market information component (block 620). For example, when multiple market information components change, the multiple market information components are updated in an order in accordance with the priority level of the market information component. For example, when market information includes a price level change and a quantity change, the high priority price level change may be updated at (or substantially near) real-time. In the illustrated example, the low priority quantity change is delayed from updating until high priority market information component changes have been updated. In some examples, a change in the highest priority market information component may cause a full market information update. That is, all market information is passed.

In some examples, while the components of the trading system (e.g., the trading device 110, the gateway 120, the electronic exchange 130 and/or other intermediary components) may provide market information coalescing, one or more components of the trading system may disable market information coalescing. For example, the gateway 120 may be utilizing increased levels of network resources and, thus, may not have processing resources available to process the market information received by the electronic exchange 130. In such examples, market information coalescing at the gateway 120 may be disabled by a user, or may be automatically disabled by the gateway 120 or the trading system 100 based on a determination of the processing resources available to one or more components (e.g., the gateway 120).

It should be appreciated that whether the market information is filtered out (block 615) or coalesced (620), it is possible that updating some market information components and not other market information components may cause incongruence between the market information displayed in a trading window at the trading device over time. Thus, a user may provide update triggers that cause all market information to update, regardless of the priority level. For example, while price level changes are between 100 and 102, the market information components update according to the associated priority levels. However, when the price level changes to a price below 100 or a price above 102, a full market information update is triggered. Thus, even if some market information components would not update according to the priority levels, they are updated because the all market information update was triggered. Other triggers are also possible.

As described above, when the electronic exchange 130 and/or the gateway 120 and/or an intermediary component is the filtering component, the market information is filtered out (e.g., dropped) and reduces the amount of market information conveyed to downstream components. For example, a price server (e.g., the example price server 222a of FIG. 2) may operate by filling packets of information with market information before communicating the packet downstream. However, the price server may communicate a packet downstream, regardless of how "full" the information packet is of market information, when the packet includes high priority market component information. In addition, the example trading device 110 may also filter out the market information by selecting what market information components are updated (or displayed) in the trading window.

In some examples, regardless of how the filtering component processes market information (e.g., segregates or coalesces the market information), a full market information update (or snapshot) is stored at the filtering component prior to filtering the market information. As a result, whenever a downstream component requests unfiltered market information, the snapshot can be conveyed to the downstream component.

In some examples, a new trading device coupled to the trading system network may request that a previous (e.g., most recent) snapshot be conveyed to the new trading device. As a result, the new trading device receives an accurate representation of the market rather than receiving stale or old information, or having to wait for new, possible slow to appear, information to appear. For example, if a snapshot was not conveyed to the new trading device, the new trading device may receive incongruent market information due to some market information components updating and other market information components not updating until a full market information update is triggered. In some examples, a new trading device coupled to the trading system network may prompt a previous (e.g., the most recent) snapshot conveyed to all trading devices using the trading system network.

VII. Examples of Depth-Dependent Market Information Updates

In some examples, the importance of market information updates varies based on its distance from the inside market. For example, the importance of market depth information to a trader may decrease relative to the number of price levels it is away from the inside market. Some known exchanges may choose to send a limited number of items in the market depth. For example, an exchange may choose to send only the first five levels of bid depth and the first five levels of ask depth. However, since market data may not exist at each price level, a market depth feed that sends five levels of bids and five levels of offers may be spread over more than ten price levels.

Figure 7:
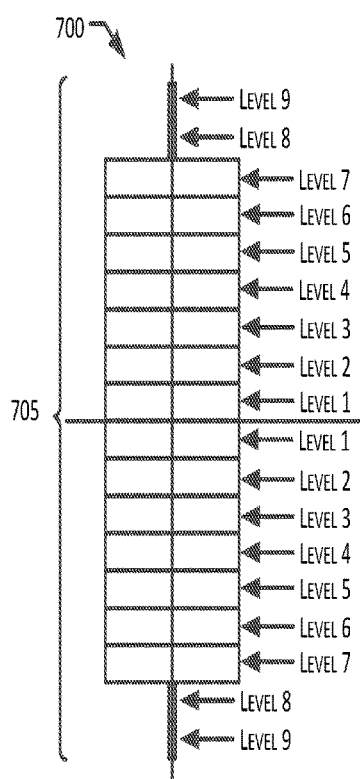
FIG. 7 illustrates an example trading window with market depth levels.

FIG. 7 illustrates an example trading window 700 with nine depth levels with market depth updates provided by current exchanges in a "square wave" pattern 705. In the illustrated example, the first seven depth levels from the inside market are updated and depth levels 8 and 9 are not updated. However, depth levels 4 and 5 may have less importance to the trader than the first three depth levels, and depth levels 6 and 7 may have less importance to the trader than depth levels 4 and 5. Furthermore, because the depth level updates are sent in an all or none square wave pattern 705, all seven depth levels are communicated to a trading device, resulting in less important market information updating at the same time as the more important market information. As a result, computer resources (e.g., bandwidth) are used to communicate less important market information when more frequent updates of the more important market information are preferred by the trader. Thus, it is beneficial to specify the frequency of depth level update frequencies for different depth levels.

Figure 8:
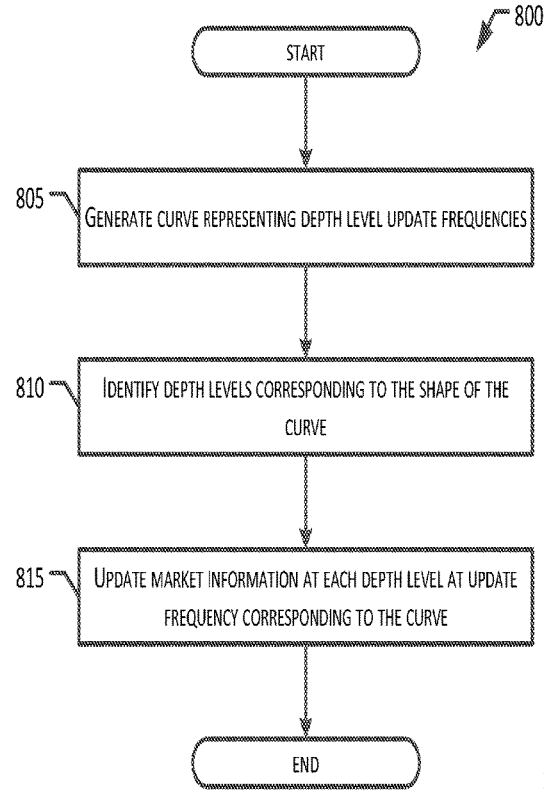
FIG. 8 illustrates a flow diagram representative of example machine readable instructions that may be executed to implement disclosed embodiments.

FIG. 8 is a flow diagram representative of example operations that can be executed to implement the teachings of this disclosure. The example operations of FIG. 8 can be implemented by, for example, the example trading device 110 of FIG. 1 and/or the example trading device 210a of FIG. 2. While the example trading device 110 of FIG. 1 is described as executing the example operations of FIG. 8 below, any suitable device can execute the example operations of FIG. 8.

In the example of FIG. 8, depth levels are updated at an update frequency corresponding to an update curve generated by a user. The example process 800 of FIG. 8 begins by generating a curve representing depth level update frequencies (block 805). For example, a user may generate a curve by dragging a curve displayed in a graphical user interface. Other methods of generating the curve are also possible. For example, a user may select one or more depth levels and then select a priority level for the selected depth levels.

Figure 9:
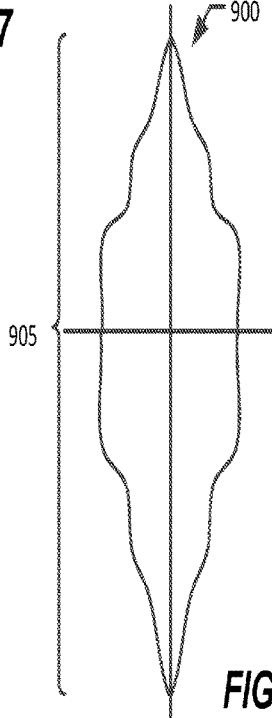
FIG. 9 illustrates an example curve generated in accordance with disclosed embodiments.

In the illustrated example, the user may manipulate the curve based on a preference or importance of depth level updates for the various depth levels. In some examples, an electronic exchange (e.g., the example electronic exchange 130 of FIG. 1) may generate and/or modify the curve depending on prevailing market conditions. For example, the electronic exchange 130 may utilize information regarding volatility, message volume on the exchange, network or server utilization statistics, etc. to modify the curve. In some examples, the curve may be generated or adjusted via an algorithmic process. FIG. 9 illustrates an example curve 905 generated by a user, an electronic exchange, or an algorithmic process. In the illustrated example of FIG. 9, the slope of the curve 905 indicates a decreasing relative update frequency for depth levels further away from the inside market.

In some examples, the display of the curve may provide additional information to the user. For example, different colors used to draw the curve or "filled in" under the curve may indicate the priority of the depth level or the importance of the depth level to the user. In some examples, a graphic included in the graphical user interface may indicate how old or stale the depth level information is at any given time. For example, the time displayed on a graphical analog clock at the different priority levels may increase as the displayed information becomes less current. In other examples, an age indicating bar may change colors over time. Other methods of indicating the age of the displayed depth level information are also possible.

Figure 10:
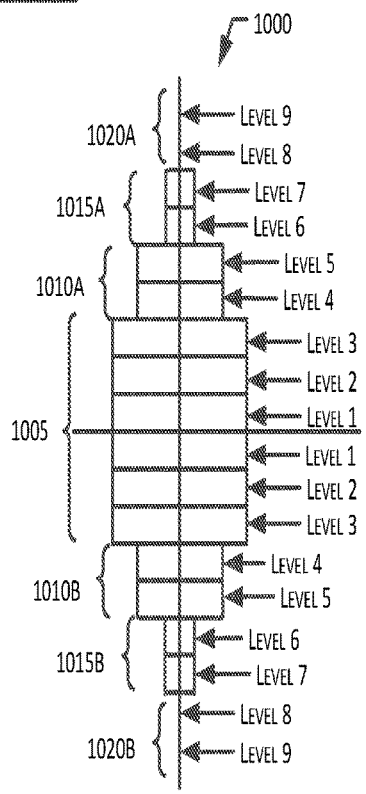
FIG. 10 illustrates an example depth level update frequency display in accordance with disclosed embodiments.

When the curve is generated or modified, the depth levels corresponding to the shape of the curve are identified (block 810). FIG. 10 illustrates an example depth level update frequency display 1000 with the varying priority levels for the depth levels represented by the different sizes of the depth levels. For example, the size of the six closest depth levels to the inside market 1005 (e.g., three depth levels above the inside market and three depth levels below the inside market) indicates a priority level with frequent updates. In contrast, the size of the sixth and seventh depth levels 1015A, 1015B from the inside market indicate lower priority levels with less frequent depth level updates.

When the depth levels are identified, the market information at each depth level updates at an update frequency corresponding to the priority levels indicated by the curve (block 815). Thus, depth level information updates at a frequency based on the importance of the depth level to the trader.

As described above, it is possible that updating some depth level information and not other depth level information may cause incongruence between the market information displayed in a trading window at the trading device over time. Thus, a user may provide update triggers that cause the market information at all depth levels to update, regardless of the priority level of the depth level.

In some markets, trades do not happen very frequently, but there is a lot of liquidity. In some such markets, market information regarding price levels or a last traded price may not be of importance to the trader. Additionally, the last traded price may not be moving, thereby not providing a situation where a full market information update is triggered over a reasonable period. As a result, waiting for an update trigger to cause the market information at all depth levels to update may result in stale information across all of the depth levels. Thus, some update triggers may be based on changes to one or more of best bid, best ask, or in quantity.

For example, the update frequency for market information corresponding to a change in quantity within a predefined range may be throttled or reduced in frequency, while changes in best bid and/or best ask (or offer) may update in (or substantially near) real-time. In other examples, changes in best bid and/or best ask may update according to the priority levels corresponding to the curve. In the illustrated example, when the price level of a best bid and/or best ask changes to a new level, a full market information update is triggered. This update trigger also allows for the instantaneous (or substantially near instantaneous) display of an edge condition, such as the sudden move up or down in the market Additionally, because of the graphical user interface, the trader can visually identify updates on price feeds when the full market information update is triggered.

Figure 11:
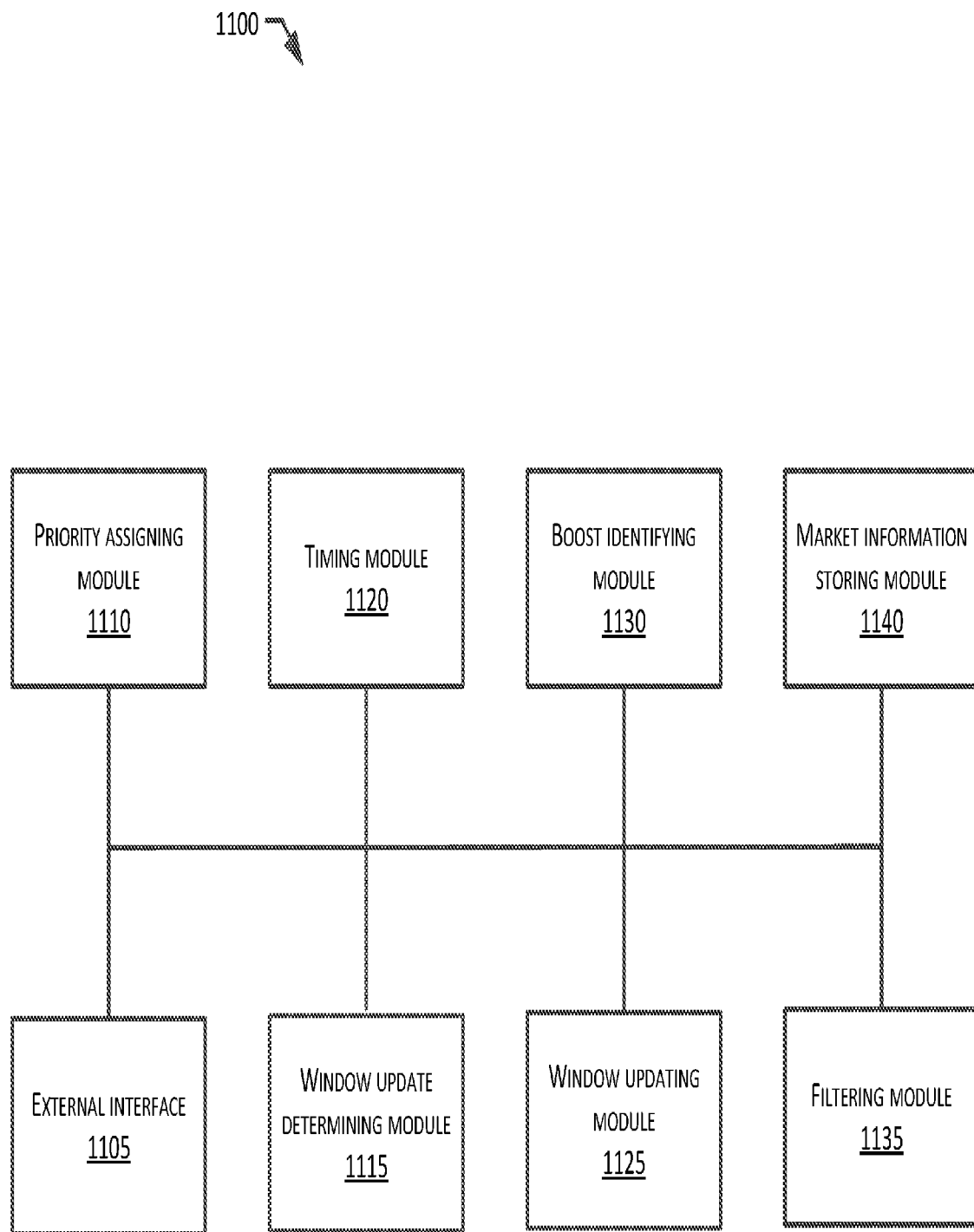
FIG. 11 illustrates a block diagram of an example system which may be employed with certain disclosed embodiments.

FIG. 11 is a block diagram of an example system 1100 that may implement and/or execute the example operations of FIGS. 4, 5, 6 and 8. In some examples, the system 1100 may be implemented as party of software (or an application) associated with the trading device 110 of FIG. 1, the gateway 120 of FIG. 1 and/or the electronic exchange 130 of FIG. 1. In some examples, the system 1100 may be implemented as computer implemented code or instructions operable independent of software associated with the trading device 110 of FIG. 1, the gateway 120 of FIG. 1 and/or the electronic exchange 130 of FIG. 1. In some examples, the features and functionality of the system 1100 may be implemented in hardware operable in connection with the trading device 110 of FIG. 1, the gateway 120 of FIG. 1 and/or the electronic exchange 130 of FIG. 1.

The example system 1100 of FIG. 11 includes an example external interface 1105. In some examples, the external interface 1105 receives user input via, for example, the trading device 110 of FIG. 1. For example, a user may assign a priority level to a window and/or one or more market information components. In other examples, the user may generate a curve representing priority levels based on the depth level. In some examples, the external interface 1105 receives market information from, for example, the electronic exchange 130 of FIG. 1, the gateway 120 of FIG. 1 and/or an intermediary component. For example, market information updates may be communicated from the gateway 120 to the trading device 110. In some such examples, the external interface 1105 of the example system 1100 receives the market information updates and stores the full market information updates (e.g., snapshots) in a market information storing module 1140. The example market information storing module 1140 may be implemented with any number and/or type(s) of tangible storage medium(s), memory(-ies), memory device(s) and/or memory disc(s). In some examples, the external interface 1105 outputs information to display on a trading screen. For example, the external interface 1105 may communicate to the trading screen what market information to display in a trading window. In some examples, the external interface 1105 outputs market information to downstream components. For example, the gateway 120 may coalesce (or segregate) the market information received from the electronic exchange 130 and then may communicate a portion of market information to a downstream component such as the trading device 110 via the external interface 1105. In some examples, the portion of market information not communicated may be filtered out (e.g., dropped).

An example priority assigning module 1110 of the example system 1100 assigns priority levels and stores the priority levels. In some examples, user input received via the external interface 1105 assigns a priority level to a trading window. In some such examples, the priority assigning module 1110 may store the trading window priority level. In some examples, the priority assigning module 1110 stores what market information is updated when the window update conditions for the trading window are satisfied. In some examples, the priority assigning module 1110 stores the update frequencies associated with the various priority levels. For example, the priority assigning module 1110 may store that the market information displayed in a trading window with the lowest priority level is to update once every window. In some examples, the priority assigning module 1110 may receive an indication to adjust the priority level of a trading window. For example, when a window boost is triggered, the priority assigning module 1110 may increase the trading window priority level. In some examples, the priority assigning module 1110 stores market information component priority levels. For example, the priority assigning module 1110 may store that price level changes are of more importance to a trader than quantity changes in the trading window. In some examples, priority levels assigned to the different depth levels in a display are stored in the priority assigning module 1110. For example, a user may indicate, via a curve generated in the trading application, that the three closest depth levels above the inside market and below the inside market are of greatest importance to the user. In such examples, the priority assigning module 1110 may store depth level update frequencies corresponding to the importance (or priority) assigned to the depth levels and/or what conditions may trigger market information updates at the depth levels.

An example window update determining module 1115 of the example system 1100 determines when market information displayed in a trading window should be updated. For example, the window update determining module 1115 may compare the market information stored in the market information storing module 1140 with window update conditions stored in the window update determining module 1115. When the window update conditions are satisfied, the window update determining module 1115 may indicate that the market information displayed in the trading window should be updated with the market information stored in the market information storing module 1140.

An example timing module 1120 of the example system 1100 is a timer used to determine, for example, when a trading window should update, when market information stored in the market information storing module 1140 should be passed to a downstream component, or when a priority level of a trading window should revert back to the pre-window boost priority level of the trading window. The timing module 1120 then indicates when a timer expires.

An example window updating module 1125 of the example system 1100 updates the market information displayed in a window when indicated. For example, when the window update conditions for a trading window are satisfied, the window updating module 1125 receives an indication from the window update determining module 1115. In response to the indication, the window updating module 1125 retrieves what market information is updated at the corresponding priority level from the priority assigning module 1110 and, using the market information stored in the market information storing module 1140, the window updating module 1125 updates the market information accordingly. In some examples, the window updating module 1125 receives an indication to update the market information at depth levels based on the priority levels of the depth levels. In some examples, the window updating module 1125 receives an indication to update all market information displayed in a trading window. In such examples, a previous (e.g., most recent) snapshot of the market information is retrieved from the market information storing module 1140. The window updating module 1125 then outputs the market information to display on the trading screen via the external interface 1105.

An example boost identifying module 1130 of the example system 1100 identifies when a window boost is triggered. In some examples, the boost identifying module 1130 stores the conditions that trigger a window boost. For example, the boost identifying module 1130 may store that when an even number of one hundreds trades have occurred a window boost should be triggered. In some such examples, the boost identifying module 1130 monitors the market information updates stored in the market information storing module 1140. In some other examples, the boost identifying module 1130 may store that when a working order is identified in a trading window, then a window boost for the trading window is triggered. In some examples, the boost identifying module 1130 may store when a timer expiration triggers a window boost. In some such examples, the boost identifying module 1130 may monitor indications from the timing module 1120. In the illustrated example, when a window boost is triggered, then the boost identifying module 1130 indicates to the priority assigning module 1110 that a priority level should be adjusted. In some examples, a user may disable one or more window boost. In some such examples, when a disabled window boost is triggered, no change in priority level is indicated to the priority assigning module 1110.

An example filtering module 1135 of the example system 1100 filters market information before passing the market information to downstream components. In some examples, the filtering module 1135 stores whether market information coalescing is enabled. In some such examples, the market information is communicated to any downstream components based on a priority level delay. For example, high priority market component information updates may incur no delay, while low priority market component information updates may update when no relatively higher priority market component information updates are available for communicating. For example, price level updates may be communicated in (or substantially near) real-time, while updates in quantities at a price level may not be communicated until no price level updates are available to communicate. In some examples when market information coalescing is not enabled (e.g., in the trading system 100 or is disabled at one or more components of the trading system 100), the market information updates are segregated based on the priority levels of the market information components. For example, market component information for high priority market information components may be communicated in (or substantially near) real-time to downstream components, while market component information for low priority market information components may be rejected (e.g., canceled).

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A non-transitory computer readable medium having stored therein instructions executable by a processor, including instructions executable to:
    assign a first priority to a window displayed as part of a trading interface, wherein the first priority identifies a first frequency at which market information displayed in the window is updated, wherein the first frequency includes a first expiration is used to set a first time period between providing market updates for display in the window;
    implement a timing module including a first timer associated with the first frequency at which market information displayed in the window is updated;
    in response to receiving a market information update, determine at the timing module whether the first timer corresponds to the first expiration;
    when the first timer corresponds to the first expiration, activate an updating module to update the window such that the received market information is displayed in the window;
    when the first timer does not correspond to the first expiration, deactivate the updating module to prevent updating the window until the first timer corresponds to the first expiration, wherein when the first timer corresponds to the first expiration, using a second market information update including updated market information received from the electronic exchange for display on the window; and
    based on a trigger activation, assign, by the trading interface, a second priority to the window, wherein the second priority increases the first frequency of updating market information displayed in the window to a second frequency of updating market information displayed in the window, wherein the second frequency is associated with a second timer defined at the timing module, wherein the second frequency corresponds to a second expiration, and wherein the second frequency reflects a shorter period than the first frequency resulting in an increase in how often market information displayed in the window.

2. The non-transitory computer readable medium of claim 1, wherein the trigger includes a trader selecting the second priority of the window a control on the trading interface.

3. The non-transitory computer readable medium of claim 1, wherein the trigger corresponds to the first expiration or the second expiration.

4. The non-transitory computer readable medium of claim 3, wherein the timer initiates when the second window priority is assigned to the window.

5. The non-transitory computer readable medium of claim 1, further including instructions executable to:
    facilitate the selection of an event that is to correspond to the market information; and
    monitor the market information for the event.

6. The non-transitory computer readable medium of claim 5, wherein when the event occurs, assigning the second priority to the window.

7. The non-transitory computer readable medium of claim 5, wherein when the event occurs, holding the first priority of the window.

8. The non-transitory computer readable medium of claim 5, wherein the event includes determining a change in a last trade price.

9. The non-transitory computer readable medium of claim 5, wherein the event includes determining a change in an inside market.

10. The non-transitory computer readable medium of claim 5, wherein the event includes determining when a trade quota is less than a trade volume, wherein the trade quota is selected prior to monitoring the market information.

11. The non-transitory computer readable medium of claim 1, the market information displayed in the window is a portion of the market information communicated by the electronic exchange.

12. The non-transitory computer readable medium of claim 11, wherein the market information communicated by the electronic exchange is filtered by the electronic exchange.

13. The non-transitory computer readable medium of claim 11, wherein the market information communicated by the electronic exchange is filtered by a gateway in communication with the electronic exchange.

14. The non-transitory computer readable medium of claim 1, wherein a user activity within the window initiates the trigger activation.

15. The non-transitory computer readable medium of claim 1, wherein the user activity comprises an order placement for the tradeable object.

* * * * *